(12) United States Patent
Kim et al.

(10) Patent No.: US 10,452,988 B2
(45) Date of Patent: Oct. 22, 2019

(54) SOLUTION SEARCH FOR COMBINATORIAL BANDIT PROBLEM

(71) Applicant: RIKEN, Wako-shi, Saitama (JP)

(72) Inventors: Song-Ju Kim, Saitama (JP); Masashi Aono, Saitama (JP); Etsushi Nameda, Saitama (JP); Masahiko Hara, Saitama (JP)

(73) Assignee: RIKEN, Saitama (JP)

( * ) Notice: Subject to any disclaimer, the term of this patent is extended or adjusted under 35 U.S.C. 154(b) by 1043 days.

(21) Appl. No.: 14/780,166

(22) PCT Filed: Mar. 17, 2014

(86) PCT No.: PCT/JP2014/001506
§ 371 (c)(1),
(2) Date: Sep. 25, 2015

(87) PCT Pub. No.: WO2014/156044
PCT Pub. Date: Oct. 2, 2014

(65) Prior Publication Data
US 2016/0042291 A1 Feb. 11, 2016

(30) Foreign Application Priority Data
Mar. 27, 2013 (JP) .................... 2013-066768

(51) Int. Cl.
*G06N 7/00* (2006.01)
*G06Q 10/04* (2012.01)

(52) U.S. Cl.
CPC ............ *G06N 7/005* (2013.01); *G06Q 10/04* (2013.01)

(58) Field of Classification Search
None
See application file for complete search history.

(56) References Cited

U.S. PATENT DOCUMENTS

2008/0140591 A1   6/2008  Agarwal et al.
2013/0095774 A1*  4/2013  Gulati ............... H04B 1/44
                                                    455/78

OTHER PUBLICATIONS

Japanese Office Action (and partial English translation thereof) dated Jan. 17, 2017 issued in counterpart Japanese Application No. 2013-066768.

(Continued)

*Primary Examiner* — Alan Chen
(74) *Attorney, Agent, or Firm* — Holtz, Holtz & Volek PC (57) ABSTRACT

A solution search system, which can search for a test object, expected to output an optimal result, from at least two test objects each outputting a result based on a probability distribution, includes: a record superiority comparing unit which can obtain past records of the test objects based on an accumulation of the output results and can compare all records for superiority/inferiority; a controlling unit which can control a measurement variable of the test objects, based on the compared superiority/inferiority records, and a latest result output from the test object; and an output instructing unit which can instruct the test object, the measurement variable of which has exceeded a threshold value, to output a result, wherein the output instructing unit determines, as a desired solution, at least one test object to which the largest number of the output instructions have finally been given after repetition of the output instructions.

14 Claims, 5 Drawing Sheets

(56) References Cited

OTHER PUBLICATIONS

Auer Peter, et al., "Finite-time Analysis of the Multiarmed Bandit Problem", Machine Learning 2002, vol. 47, pp. 235-256.
International Search Report (ISR) dated Jun. 10, 2014 issued in International Application No. PCT/JP2014/001506.
Vermorel Joanne, et al., "Multi-Armed Bandit Algorithms and Empirical Evaluation", Proceedings of the 16th European Conference on Machine Learning, Oct. 2005, vol. 3720, pp. 437-448.
Aono, et al., "Amoeba-inspired Tug-of-War algorithms for exploration—exploitation dilemma in extended Bandit Problem", BioSystems 117 (2014) 1-9.
Kim, et al., "Adaptive Tug-of-war Model for Two-armed Bandit Problem", 2011 International Symposium on Nonlinear Theory and its Applications NOLTA2011, Kobe, Japan, Sep. 4-7, 2011, pp. 176-179.
Kim, et al., "Amoeba-inspired algorithm for cognitive medium access", Nonlinear Theory and Its Applications, IEICE, vol. 5, No. 2, pp. 198-209, Apr. 1, 2014.
Kim, et al., "Decision Maker based on Atomic Switches", WPI Center for Materials Nanoarchitectonics, National Institute for Materials Science, Jul. 21, 2015.
Kim, et al., "Decision Maker based on Nanoscale Photo-excitation Transfer", Sci. Rep. 3, 2370; DOI:10.1038/srep02370 (2013).
Kim, "Decision Maker using Coupled Incompressible-Fluid Cylinders", Feb. 13, 2015.
Kim, "Efficient Decision-Making by Volume-Conserving Physical Object", Dec. 22, 2014.
Kim, et al., "Harnessing Natural Fluctuations: Analogue Computer for Efficient Socially Maximal Decision Making", pp. 1-30, Apr. 15, 2015.
Kim, "Tug-of-war model for the two-bandit problem: Nonlocally-correlated parallel exploration via resource conservation", BioSystems 101, 29-36 (2010).
Naruse, et al., "Decision Making by Single Photons", Scientific Reports, DOI:10.1038/srep13253, Aug. 17, 2015.
Zhu, et al., "Problem-Size Scalability of Amoeba-based Neurocomputer for Traveling Salesman Problem", 2011 International Symposium on Nonlinear Theory and its Applications, NOLTA2011, Kobe, Japan, Sep. 4-7, 2011, pp. 108-111.
Zhu, "Slime mold computer and the probability search algorithm", Advanced application of probability theory in the system control information: Special Issue, Dec. 2015.

\* cited by examiner

SOLUTION SEARCH FOR COMBINATORIAL BANDIT PROBLEM

TECHNICAL FIELD

The present invention relates to a solution search system, a solution search method, and a solution search program which are suitable for obtaining a solution to a combinatorial reward maximization problem rapidly and efficiently.

BACKGROUND ART

Conventionally, a bandit problem has been known as a representative example of a problem of searching for a solution capable of maximizing an expected value. A purpose of the bandit problem is to maximize an expected value of the total of rewards one can receive. In the bandit problem, a player repeats choosing, by a certain action, one option from n-types of different options of action. After each selection, a result selected from a probability distribution which depends on the selected action is given to the player as a reward.

Take the following case as an example: There are several slot machines, and a player can get a coin (a reward) by pulling a lever of the machine, under a certain probability distribution. The probability distribution (a winning rate) of getting a coin differs among each of the slot machines, and the player has no knowledge about the winning rate. In such case, a most common method for evaluating the winning rate of each of the slot machines is simply to play each of the slot machines multiple times one after another. The slot machine which actually provides the highest reward is determined to be the machine of the highest winning rate.

In the above method, however, the player has to play the slot machines for a considerable number of times in order to determine a machine with the highest winning rate in fact. This, as a result, requires a large investment. It is necessary, therefore, to create an algorithm capable of finding a solution efficiently, as well as reducing an investment as much as possible, in searching for the winning rate of each of the slot machines.

To find a solution, the above case can be applied to the bandit problem described above, which is a problem of searching for a solution capable of maximizing an expected value of the total of rewards (for example, refer to Non Patent Literature 1). In particular, a combinatorial bandit problem has recently been drawing attention. In the combinatorial bandit problem, a combination of options which is expected to output an optimal result is selected from n-types of different options of action. There is a need for the combinatorial bandit problem in various fields, other than selecting a combination of slot machines which is likely to provide a high dividend from among a plurality of slot machines. For example, the combinatorial bandit problem can be used in selecting an optimal channel combination which is able to maximize the amount of data transmission in cognitive radio communication, an optimal advertisement combination to maximize the click count in Internet advertising, and a portfolio of financial instruments with the highest return on investment. In these applications, the bandit problem is a commoner type of a combinatorial reward maximization problem. In other words, there are multiple players, and the amount of reward for each player is determined depending on the choice by the player (for example, by a payoff matrix). In the present description, however, a combinatorial reward maximization problem in which each slot machine is independent of each other (particularly, a combination of two slot machines) is described with examples for simplification.

CITATION LIST

Patent Literature

Non Patent Literature 1: S. J. Kim, M. Aono, M. Hara, BioSystems 101, 29-36 (2010)

SUMMARY OF INVENTION

Technical Problem

Conventionally, however, an algorithm for searching automatically for a solution of a combinatorial bandit problem has not particularly been proposed. As the amount of information has been increasing in recent years, it is anticipated that social demand for obtaining a solution to the combinatorial bandit problem rapidly and efficiently from a large amount of information will increase. Actually, however, no specific solution has been proposed to address such need.

The present invention has been developed in view of the foregoing. An objective of the present invention is to provide a solution search system, a solution search method, and a solution search program solution search system which are capable of obtaining a solution to a combinatorial bandit problem rapidly and efficiently.

Solution to Problem

To solve the above problem, a solution search system to which the present invention is applied is configured to search for a test object expected to output an optimal result, among at least two test objects each of which outputs a result based on a probability distribution, and the solution search system includes: a record superiority comparing unit configured to obtain a past record for each of the test objects, based on an accumulation of the results having been output, and to compare the records of the test objects in terms of superiority and inferiority in relation to the records of all the test objects; a controlling unit configured to perform a control to increase or decrease a measurement variable for each of the test objects, based on the superiority/inferiority of the record having been compared by the record superiority comparing unit, and a latest result having been output from the test object; and an output instructing unit configured to instruct the test object, the measurement variable of which has exceeded a threshold value, to output a result, and the output instructing unit determines, as a desired solution, at least one test object to which the largest number of the output instructions have finally been given after repetition of the output instructions.

A solution search program to which the present invention is applied is configured to search for a test object expected to output an optimal result, among at least two test objects each of which outputs a result based on a probability distribution, and the solution search program includes the steps of: record superiority comparing, in which a past record is obtained for each of the test objects, based on an accumulation of the results having been output, and the records of the test objects are compared in terms of superiority and inferiority in relation to the records of all the test objects; controlling, in which a control is performed to increase or decrease a measurement variable for each of the test objects, based on the superiority/inferiority of the record having been compared by the record superiority comparing unit, and a latest result having been output from the test object; and output instructing, in which the test object, the measurement variable of which has exceeded a threshold value, is instructed to output a result, and in the output instructing step, a computer is caused to determine, as a desired solution, at least one test object to which the largest number of the output instructions have finally been given after repetition of the output instructions.

A solution search method to which the present invention is applied is a method for searching for a test object expected to output an optimal result, among at least two test objects each of which outputs a result based on a probability distribution, and the solution search method includes the steps of: record superiority comparing, in which a past record is obtained for each of the test objects, based on an accumulation of the results having been output, and the records of the test objects are compared in terms of superiority and inferiority in relation to the records of all the test objects; controlling, in which a control is performed to increase or decrease a measurement variable for each of the test objects, based on the superiority/inferiority of the record having been compared by the record superiority comparing unit, and a latest result having been output from the test object; and output instructing, in which the test object, the measurement variable of which has exceeded a threshold value, is instructed to output a result, and in the step of output instructing, at least one test object to which the largest number of the output instructions have finally been given after repetition of the output instructions of the result is determined as a desired solution.

Advantageous Effects of Invention

With the above configuration of the present invention, a measurement variable is increased or decreased based on superiority and/or inferiority of a past record having been output from a test object, and a latest result having been output from the test object, and, depending on the value of the measurement variable, it is determined whether or not output of a result is instructed. Then, after the instruction to output the result is repeated, a combination of test objects in respect of which the instruction to output the result has been issued most frequently is finally determined to be a desired combination. This makes it possible to automatically search for and find a solution to the combinatorial bandit problem. As a result, even though the amount of information has been continuously increasing in recent years, a solution to the combinatorial bandit problem is obtained rapidly and efficiently from a large amount of information.

DESCRIPTION OF EMBODIMENTS

The solution search system to which the present invention is applied is described below in detail, with reference to the attached drawings.

Figure 1:
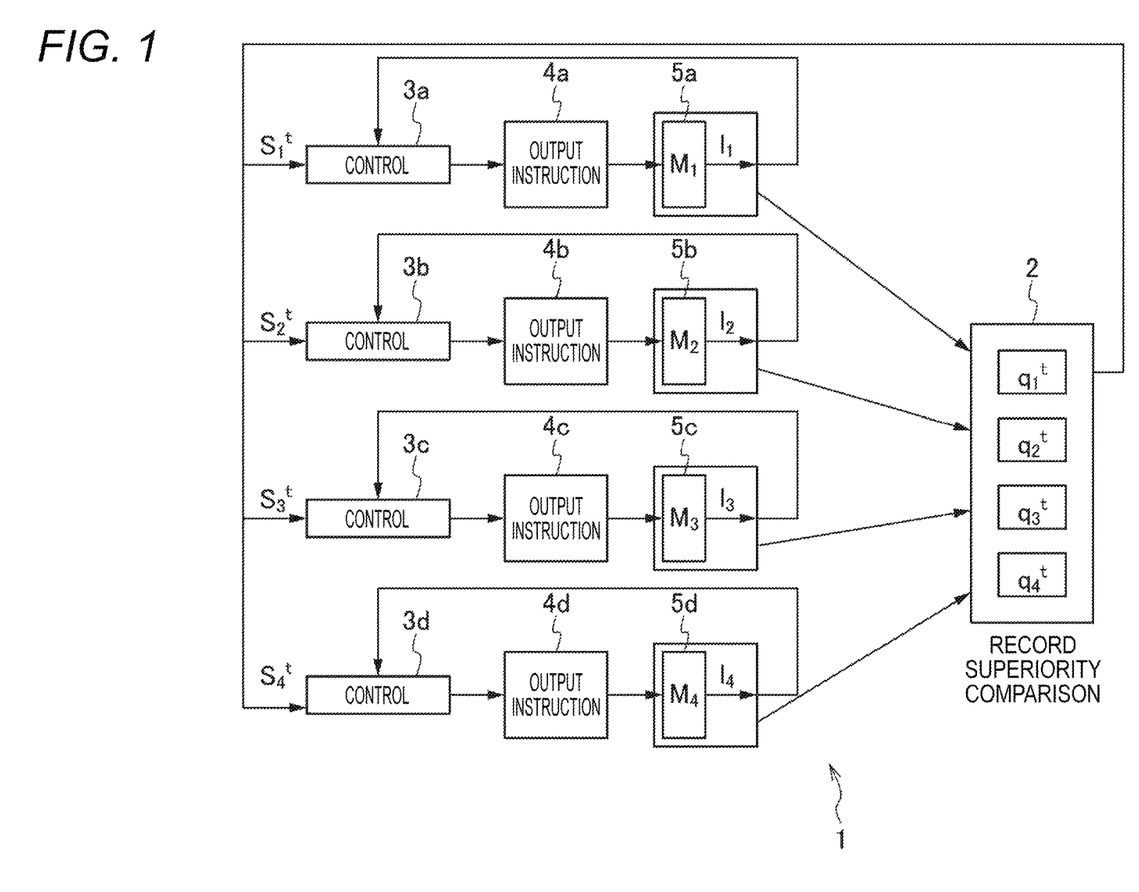
FIG. 1 is a diagram showing an entire configuration of a solution search system to which the present invention is applied.

FIG. 1 shows an entire configuration of a solution search system 1 to which the present invention is applied. The solution search system 1 selects a combination of test objects 5 which is expected to output an optimal result, from among at least two test objects 5a-5d. The solution search system 1 includes a record superiority comparing part 2, a controlling part 3a-3d connected to the record superiority comparing part 2, and an output instructing part 4a-4d connected to the controlling part 3a-3d.

The controlling part 3a-3d and the output instructing part 4a-4d are each provided in the same number as the test object 5. In the example shown in FIG. 1, the system has four controlling parts 3 and four output instructing parts, as there are four test objects 5.

The test object 5 outputs a result based on a probability distribution specific to each test object 5. For example, the test object 5 may be a slot machine or a pachinko (Japanese pinball) machine which outputs coins and the like as deliverables based on a predetermined probability distribution. In cognitive radio communications, a relative amount of data transmission in each channel fluctuates on each occasion. Such amount of data transmission is represented by a probability distribution which has been set on a time point. When a certain channel is selected in the cognitive radio communications, therefore, an "actual" amount of data transmission is output as a deliverable. In Internet advertising, a relative click count of an advertisement to be published is represented by a probability distribution, and an "actual" click count as a deliverable is calculated based on the probability distribution. For a financial instrument, a future return thereof is represented by a probability distribution, and an "actual" return on investment as a deliverable is expressed based on the probability distribution.

As described above, the test object 5 is a concept including any event, material object, system, program, and algorithm, an output result of which is able to be transformed into a probability distribution. A probability distribution used for a result which is output from the test object 5 may be a normal distribution, a Gaussian distribution, and a discrete distribution, or may be structured with a binominal distribution. A user of the solution search system 1 is not informed about the probability distribution of the test object 5. The user will use the solution search system 1 to find a combination of test objects which is expected to output an optimal result, from among the test objects.

Each of the test objects 5a-5d outputs a result I based on a probability distribution having been set individually. Results to be output from the test objects 5a, 5b, 5c, and 5d are denoted by $I_1$, $I_2$, $I_3$, and $I_4$, respectively. The result $I_1$ is sent to the record superiority comparing part 2, and at the same time, to the controlling part 3a. The result 12 is sent to the record superiority comparing part 2, and at the same time, to the controlling part 3b. The result 13 is sent to the record superiority comparing part 2, and at the same time, to the controlling part 3c. The result 14 is sent to the record superiority comparing part 2, and at the same time, to the controlling part 3d.

The record superiority comparing part 2 receives and stores the results $I_1$-$I_4$ which are output from the test objects 5a-5d. The record superiority comparing part 2 accumulates the results $I_1$-$I_4$ by storing them sequentially each time the result $I_1$-$I_4$ is received from the test object 5a-5d. The record superiority comparing part 2 then calculates a past record for each of the test objects 5a-5d based on an accumulation of results having been output. The past record here means any kind of data indicating whether a result output from the test object 5 is superior or inferior to a result output from another test object 5. When the test object 5 is a slot machine, the past record may represent how many coins have been dispensed. When the test object 5 is an Internet advertisement, the past record may be a piece of data representing how many times the advertisement has been clicked. Furthermore, the record superiority comparing part 2 determines superiority/inferiority of the record of each of the test objects 5 in relation to the records of all the test objects 5. The superiority/inferiority of the test objects 5a, 5b, 5c, and 5d in relation to all the test objects 5 are denoted by $s_1^t$, $s_2^t$, $s_3^t$, and $s_4^t$, respectively. The superiority/inferiority data $s_1^t$, $s_2^t$, $s_3^t$, and $s_4^t$ are each sent to the controlling part 3a, 3b, 3c, and 3d, respectively.

Each of the respective controlling parts 3a-3d receives the corresponding piece of data about superiority/inferiority of record $s_1^t$-$s_4^t$ from the record superiority comparing part 2. At the same time, each of the respective controlling parts 3a-3d receives the latest result $I_1$-$I_4$ from the corresponding test object 5a-5d. The controlling part 3a-3d performs a control so as to increase or decrease the measurement variable, based on the corresponding piece of input data about superiority/inferiority of record $s_1^t$-$s_4^t$, and the latest result having been output from the test object 5a-5d.

Figure 2:
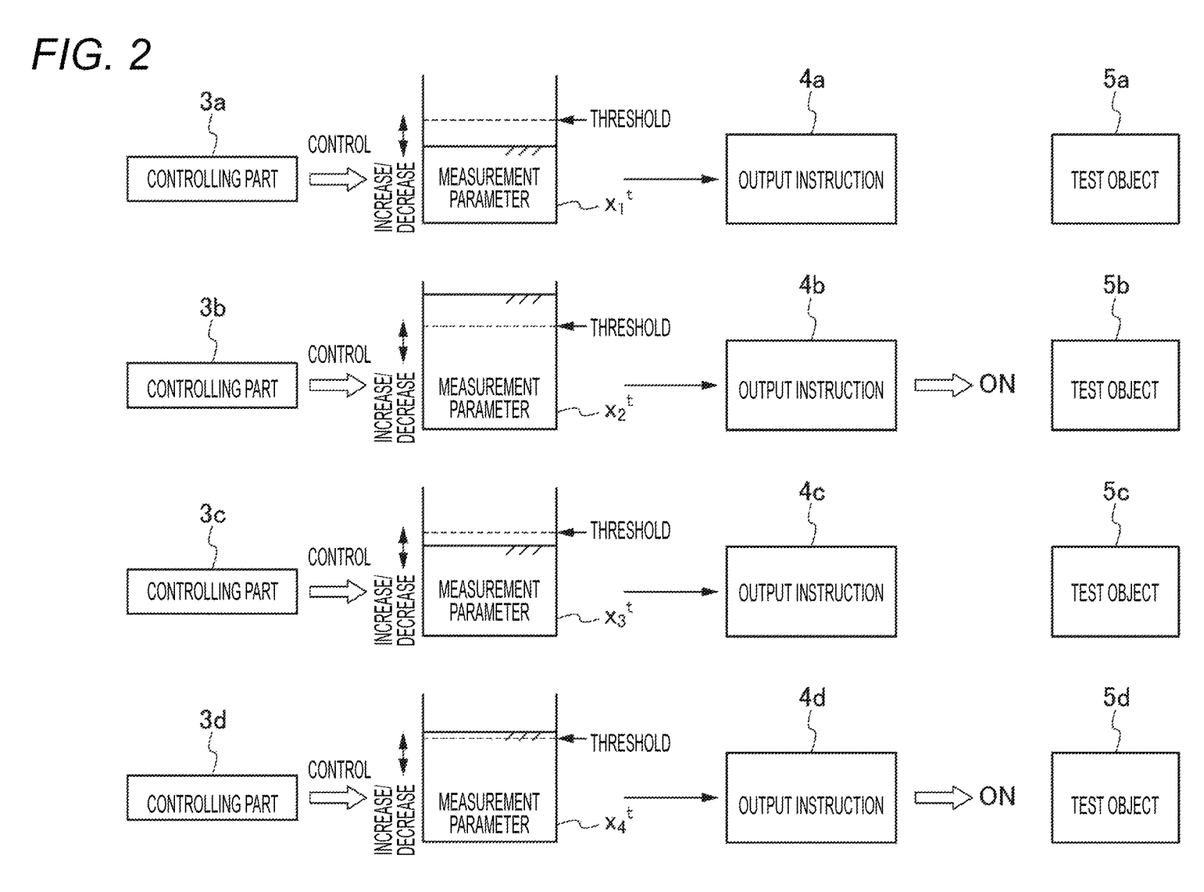
FIG. 2 is a diagram for explaining a measurement variable.

FIG. 2 is a diagram for explaining the image of the measurement variable. The measurement variable $x^t$ is a parameter assigned individually to the test object 5. The measurement variable is used as a criterion to determine whether or not to select the test object 5. The higher the value of the measurement variable $x^t$ is, the higher is the possibility that the test object 5 will be selected. The lower the value of the measurement variable $x^t$ is, the higher is the possibility that the test object 5 will NOT be selected.

The controlling part 3 controls the increase and decrease in the measurement variable $x^t$ described above. Specifically: the controlling part 3a controls the increase and decrease in the measurement variable $x_1^t$ based on the result $I_1$ and the superiority/inferiority data $s_1^t$; the controlling part 3b controls the increase and decrease in the measurement variable $x_2^t$ based on the result $I_2$ and the superiority/inferiority data $s_2^t$; the controlling part 3c controls the increase and decrease in the measurement variable $x_3^t$ based on the result $I_3$ and the superiority/inferiority data $s_3^t$; and the controlling part 3d controls the increase and decrease in the measurement variable $x_4^t$ based on the result $I_4$ and the superiority/inferiority data $s_4^t$. The controlling part 3 can control the measurement variable $x^t$ in any possible form, as long as the measurement variable is controlled based on the result $I$ and the superiority/inferiority data $s^t$.

The output instructing part 4a-4d monitors the measurement variable, and determines whether or not the measurement value exceeds a predetermined threshold value. When the output instructing part determines that the measurement variable has exceeded the threshold value, the output instructing part instructs the test object 5 to output a result. In the example shown in FIG. 2, the measurement variables $x_2^t$ and $x_4^t$ have exceeded the threshold value. Accordingly, the output instructing part 4b monitoring the measurement variable $x_2^t$ and the output instructing part 4d monitoring the measurement variable $x_4^t$ instruct the corresponding test objects 5b and 5d to output results.

As described above, a feedback control is implemented in the order of the record superiority comparing part 2, the controlling part 3, and the output instructing part 4, with the test object 5 as a center. The solution search system 1 including the record superiority comparing part 2, the controlling part 3, and the output instructing part 4 can take the form of any device such as an analog circuit or a digital circuit. When the system is realized as a circuit, the circuit can be configured based on a field-programmable gate array (FPGA). A program is another possible form of the present invention. Such program includes a record superiority comparing step, a controlling step, and an output instructing step, in which the same process is implemented as in the record superiority comparing part 2, the controlling part 3, and the output instructing part 4, respectively. It is also desirable that the present invention be realized by way of a hardware (e.g., a personal computer, and various types of portable information terminals) which operates based on the above program.

The following is a description of a combinatorial search operation performed by the solution search system 1 to which the present invention is applied.

First, some of the test objects 5a-5d output results. An instruction to output a result is sent only to the test object 5a-5d to which the output instructing part 4 has issued such instruction.

A result I having been output from the test object 5a-5d is sent to the record superiority comparing part 2 as well as to the controlling part 3. The record superiority comparing part 2 performs a process described below in detail, based on the result I having been received.

In the following Formula (1), an index representing a record of each of the test objects 5a-5d is denoted by $q_i^t$. A feedback count in the solution search system 1 is denoted by t in the record index $q_i^t$. A number corresponding to each of the test objects 5, which is represented by a subscript number in FIG. 1, is denoted by i in the record index $q_i^t$. In other words, the record index $q_i^t$ is calculated for each number of i, that is, for each of the test objects 5.

[Mathematical Formula 1]

$$q_i^t = \alpha \cdot q_i^{t-1} + \Sigma_{j \in I \setminus \{i\}} \mu \cdot (\rho_i^t \cdot \rho_j^t + \omega \cdot \Sigma_{(k,l) \in I_2 \setminus \{(i,j)\}} \pi_k^t \cdot \pi_{k'}^t) \quad (1)$$

The record index $q_i^t$ is updated each time the feedback count t increases. The record index $q_i^t$ is represented by adding the terms following $\Sigma$ to the record index $q_i^{t-1}$ which has been obtained at the time of the previous feedback count "t−1". In Formula (1), there is a forgetting parameter denoted by $\alpha$. The forgetting parameter is set as needed.

Among the terms following $\Sigma$, the term $\mu$ is a coefficient. Superiority of the output result is denoted by $\rho_i$ and $\rho_j$. When the test object 5, the record index $q_i^t$ of which is to be calculated, has output a superior result, the value of $\rho_i$ is one. When the same test object 5 has output an inferior result, the value of $\rho_i$ is zero. When another test object 5 corresponding to j has output a superior result, the value of $\rho_j$ is one. When the same test object 5 has output an inferior result, the value of $\rho_j$ is zero. In the present description, $\rho$ has two variables, since the system, as an example, selects a combination of two test objects.

Table 1 shows possible values of $\rho$ and $\pi$.

TABLE 1

|   | Superior | Inferior | No output |
|---|---|---|---|
| ρ | 1 | 0 | 0 |
| π | 0 | 1 | 0 |

Since part of Formula (1) in parentheses is expressed as multiplication such as "$\rho_i \cdot \rho_j$", the quantity of the part in parentheses is positive, only when both $\rho_i$ and $\rho_j$ are one.

When the test object 5 other than those of i and j has output an inferior result, the value of π is one. When the same test object 5 has output a superior result, the value of π is zero.

The value of the part of Formula (1) in parentheses, therefore, increases when the test object 5, the record index $q_i^t$ of which is to be calculated, has output a superior result, and also when an test object 5 other than the test object 5, the record index $q_i^t$ of which is to be calculated, has output an inferior result. When the test object 5 is a slot machine for example, and when a slot machine, the record index $q_i^t$ of which is to be calculated, has won, the numerical value of the part of Formula (1) in parentheses increases. When the slot machine, the record index $q_i^t$ of which is to be calculated, has lost, the numerical value of the part of Formula (1) in parentheses maintains. Further, when a slot machine other than the slot machine, the record index $q_i^t$ of which is to be calculated, has won, the numerical value of the part of Formula (1) in parentheses maintains. When a slot machine other than the slot machine, the record index $q_i^t$ of which is to be calculated, has lost, the numerical value of the part of Formula (1) in parentheses increases. As the numerical value of the part of Formula (1) in parentheses increases, so does the record index $q_i^t$, which means the record is superior.

As described above, in the present invention, when a test object 5, the record index $q_i^t$ of which is to be calculated, has output a superior result, and also when the other test objects have output inferior results, the past record $q_i^t$ of the test object 5 is ranked higher. When a test object 5, the record index $q_i^t$ of which is to be calculated, has output an inferior result, and also when the other test objects have output superior results, the past record $q_i^t$ of the test object 5 remains unchanged. The record superiority comparing part 2 perform control of the record in this manner, but is not limited to the aforementioned control based on Formula (1).

Which of the output results is superior or inferior is determined by any criterion. For example, in the case of the slot machine described above, superiority/inferiority of the machine is determined not only based on whether a coin is simply dispensed or not. The superiority/inferiority can also be determined depending on the number or type of coins. In addition, the superiority/inferiority can be determined at more than two levels, without limited to two levels, i.e., "superior" and "inferior". In the case of ranking at more than two levels, as one test object 5 is ranked higher, the record index $q_i^t$ thereof increases, and as the other test objects 5 are ranked lower, the record index $q_i^t$ decreases.

As described thus far, the record superiority comparing part 2 obtains the record index $q_1^t$-$q_4^t$ in respect of each of the test objects 5a-5d, and then compares superiority/inferiority of the record index $q_1^t$-$q_4^t$ in relation to the records of all the test objects 5. After that, the record superiority comparing part 2 outputs an internal resource value $s_i^t$ for each of the test objects 5a-5d, as a result of comparing the superiority/inferiority.

It is also desirable to compare superiority/inferiority of the test objects 5a-5d based on the following Formula (2).

[Mathematical Formula 2]

$$s_i^t = x_0^t + q_i^{t-1} - \text{Mean}_{k \in \Lambda[i]}\{q_k^{t-1}\} \quad (2)$$

In Formula (2), the internal resource value $s_i^t$ is a difference between the record $q_i^{t-1}$ of one test object 5 and the mean of the records $q_k^{t-1}$ of all the test objects 5. For example, when the internal resource value $s_i^t$ of the test object 5a is desired, the difference between the record $q_i^{t-1}$ of the test object 5a and the mean of the records of all the test objects $q_1^{t-1}$, $q_2^{t-1}$, $q_3^{t-1}$, and $q_4^{t-1}$ is calculated. The value of the term $x_0^t$ in the right hand side of Formula (2) is an adjustment value and is not essential. Formula (2) is not the only way to evaluate the internal resource value $s_i^t$. Any calculation formula or method can be used to evaluate the internal resource value $s_i^t$, provided that the internal resource value $s_i^t$ indicates whether or not the record $q_i^{t-1}$ of one test object 5 corresponding to the internal resource value $s_i^t$ is relatively superior to the other test objects 5. The record superiority comparing part 2 outputs the calculated internal resource values $s_1^t$-$s_4^t$ to the corresponding controlling parts 3a-3d.

When the internal resource values $s_1^t$-$s_4^t$ and latest results $I_1^t$-$I_4^t$ from the test objects 5a-5d are input into the controlling part 3a-3d, the controlling part 3a-3d performs the control described below, for example.

Table 2 shows an example of a table which is taken into consideration in the control performed by the controlling part 3.

TABLE 2

|  | $s_i^t > 0$ | $s_i^t = 0$ | $s_i^t < 0$ |
| --- | --- | --- | --- |
| $I_i^t = -1$ | 1 | 1 | 0 |
| $I_i^t = 1$ | 0 | -1 | -1 |

According to Table 2, the controlling part 3 determines a control method based on a matrix formed of the internal resource value $s_i^t$ and the latest result $I_i^t$ having been output from the test object 5. The equation "$I_i^t=-1$" indicates that a superior result has been output. The equation "$I_i^t=1$" indicates that an inferior result has been output. Any criterion can be used to determine the superiority/inferiority of $I_i^t$.

The meanings of the numerical values (-1, 0, and 1) in Table 2 are as follows: The value "-1" means that a growth rate of a measurement variable x is decreased. The value "0" means that a growth rate of a measurement variable $x^t$ is not increased or decreased. The value "1" means that a growth rate of a measurement variable $x^t$ is increased.

In the following example, it is postulated that the term $x_0^t$ is determined depending on the value of $x_i$.

The controlling part 3 specifically performs the following control based on Table 2.

When the internal resource value $s_i^t$ is positive, and the latest result $I_i^t$ having been output from the test object 5 is superior (=-1), the numerical value is "1", and therefore a growth rate of a measurement variable $x^t$ is increased; When the internal resource value $s_i^t$ is positive, and the latest result $I_i^t$ having been output from the test object 5 is inferior (=1), the numerical value is "0", and therefore a growth rate of a measurement variable $x^t$ is maintained, not increased; When the internal resource value $s_i^t$ is zero, and the latest result $I_i^t$ having been output from the test object 5 is superior (=-1), the numerical value is "1", and therefore a growth rate of a measurement variable $x^t$ is increased; When the internal resource value $s_i^t$ is zero (0), and the latest result $I_i^t$ having been output from the test object 5 is inferior (=1), the numerical value is "-1", and therefore a growth rate of a measurement variable $x^t$ is decreased; When the internal resource value $s_i^t$ is negative, and the latest result $I_i^t$ having been output from the test object 5 is superior (=-1), the numerical value is "0", and therefore a growth rate of a measurement variable $x^t$ is maintained; and When the internal resource value $s_i^t$ is negative, and the latest result $I_i^t$ having been output from the test object 5 is inferior (=1), the numerical value is "−1", and therefore a growth rate of a measurement variable $x^t$ is decreased.

As described above, the controlling part 3 performs a control so as to increase and decrease the measurement variable $x^t$, based on the internal resource value $s_i^t$ calculated based on superiority/inferiority of records compared by the record superiority comparing part 2, and the latest result $I_i^t$ having been output from the test object 5. The numerical values in Table 2 are given simply by way of example, and thus any numerical value can be chosen, provided that the numerical value is based on the internal resource value $s_i^t$ and the latest result $I_i^t$.

In the above-described example, a 2-by-3 matrix is created, with the internal resource value $s_i^t$ shown in three levels, and with the latest result $I_i^t$ shown in two levels. However, the internal resource value $s_i^t$ and the latest result $I_i^t$ can be divided into any number of levels, without limited to the above matrix, as long as each of them is in at least two levels.

Furthermore, the controlling part 3 is not limited to the above case in which a matrix table such as the above specifies a method for controlling the increase and decrease of the measurement variable $x^t$. The controlling part 3 can control the increase and decrease of the measurement variable $x^t$ based on any other method, provided that the method is based on the internal resource value $s_i^t$ and the latest result $I_i^t$. Specifically, such control method can be determined according to a specified operational expression including variables indicating the internal resource value $s_i^t$ and the latest result $i_i^t$.

As a result of controlling the increase and decrease of the measurement variable $x^t$ by the controlling part as described above, the measurement variable $x^t$ with respect to one test object 5 is less than the threshold value, and the measurement variable $x^t$ with respect to another test object 5 is equal to or more than the threshold value, as shown in FIG. 2. The output instructing part 4 compares the measurement parameters $x^t$ in reference to the relation to the threshold value. The output instructing part 4 then gives an instruction to output the result, only to the test object 5 corresponding to the measurement variable $x^t$ having exceeded the threshold value. The test object 5 having received the instruction to output the result outputs a new result based on corresponding probability distribution.

In the solution search system 1 in which the present application is applied, the above process is repeated. As a result, patterns of a combination of the test objects 5 to which the output instructing part 4 issues the output instruction are gradually narrowed. The test objects 5 to which the output instruction is issued are finally narrowed down to fixed ones. The narrowed-down combinations of the test objects 5 are a solution selected by the solution search system 1.

When the solution search system 1 searches for a solution, the sum of the measurement variables $x_1$-$x_4$ which are assigned to the respective test objects 5a-5d and the term $x_0^t$ is kept constant, so that search accuracy is increased. Specifically, by keeping the value of "$x_0^t+x_1+x_2+x_3+x_4$" constant, the measurement variables $x^t$ are prevented from increasing as a whole and deviating from the threshold value. This, consequently, increases the search accuracy.

The term $x_0^t$ is a variable which is influenced by the value of the other measurement variable $x_i$. After the operation of the process described above proceeds repeatedly, the term $x_0^t$ is dominant first, in the above Formula (2), while the terms following $q_i^{t-1}$ (the difference between the record of one test object 5 $q_i^{t-1}$ and the mean of the records of all the test objects 5 $q_k^{t-1}$) do not have much influence on determining the term $s_i^t$. As a result, the term $s_i^t$ has great flexibility, without influenced by the difference between the record $q_i^{t-1}$ and the mean of the records $q_k^{t-1}$. The term $s_i^t$ has, therefore, a random value easily. This makes it possible to search a variety of solutions, since various output instructions 4a-4d are issued via the term $s_i^t$ which takes a random value easily.

As the value of t increases, in other words, as a feedback count increases, the value of the terms following $q_i^{t-1}$ (the difference between the record of one test object 5 $q_i^{t-1}$ and the mean of the records of all the test objects 5 $q_k^{t-1}$) gradually increases. Accordingly, the value of the difference between the record $q_i^{t-1}$ and the mean of the records $q_k^{t-1}$ becomes more dominant than the term $s_i^t$, in determining the term $s_i^t$. After that, a combination of the test objects 4a-4d to which the output instruction is issued next time is influenced by the value of the difference between the record $q_i^{t-1}$ and the mean of the records $q_k^{t-1}$.

In this manner, combinations of the test objects 5a-5d to which the output instruction is issued are finally narrowed down to those influenced by the value of the difference between the record $q_i^{t-1}$ and the mean of the records $q_k^{t-1}$.

With the above configuration of the present invention, the measurement variable is increased or decreased, based on the superiority/inferiority of the past record having been output from the test object 5, and the latest result having been output from the test object 5. It is determined, depending on the increased or decreased value of the measurement variable, whether or not an instruction to output the result is issued. Then, after repeating the instruction to output the result, a combination of the test objects 5 to which the instruction to output the result has been issued most frequently is finally determined to be a desired combination. This makes it possible to automatically search for and find a solution to the combinatorial bandit problem. As a result, even though the amount of information has continuously been increasing in recent years, a solution to the combinatorial bandit problem can be obtained rapidly and efficiently from a large amount of information.

Figure 3:
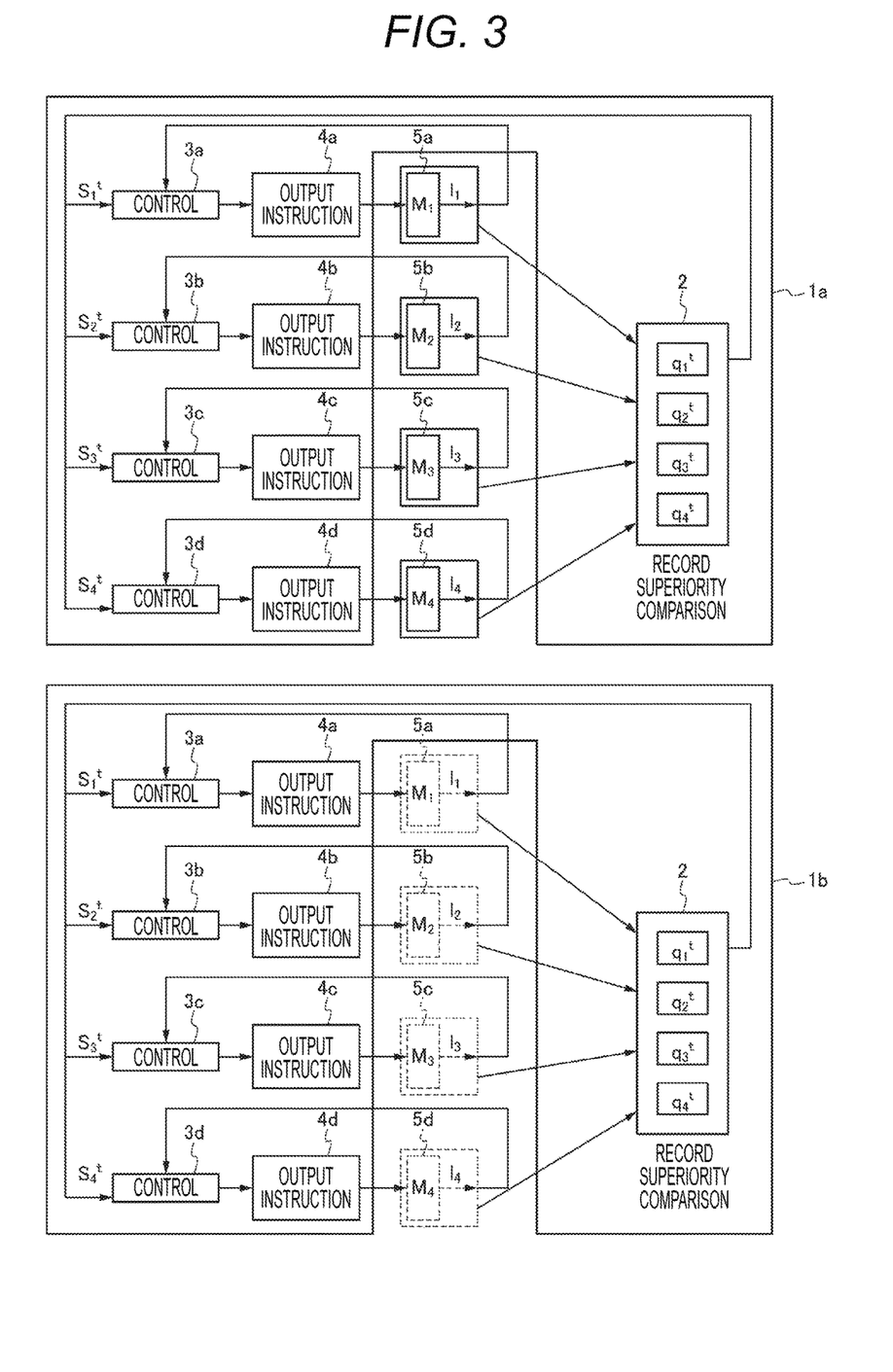
FIG. 3 is a diagram showing an entire configuration of another example of a solution search system to which the present invention is applied.

The present invention is not limited to the above-described embodiment. For example, the test object 5 is explored by using two or more solution search systems 1, as shown in FIG. 3. FIG. 3 shows an embodiment in which two solution search systems 1a and 1b are used to explore the test objects 5a-5d. The two solution search systems 1a and 1b explore the same group of the test objects 5a-5d. In FIG. 3, therefore, the test objects 5a-5d indicated by a dotted line in the solution search system 1b are the same test objects 5a-5d indicated by a solid line in the solution search system 1a.

In this case, the number of the test objects 5 is at least two. In other words, one test object 5 which is expected to output an optimal result is selected from among the at least two test objects 5. This means the embodiment is not limited to searching for a combination of two or more test objects 5. In some cases, the systems of the embodiment search for a single test object 5 as a solution.

Also in this case, the test object 5 is not limited to a probability distribution set in advance. The probability distribution may be a time-series probability distribution which, in other words, varies with the passage of time. Furthermore, in some cases, the change of the time-series probability distribution of the test object 5 corresponds to the output instruction issued by the output instructing part 4a-4d. Specifically, for example, when the output instructing part 4b issues an output instruction, only the test object 5b corresponding to the output instructing part 4b changes the probability distribution thereof in response to the output instruction. The test object 5b outputs the result, based on the probability distribution having been changed.

Furthermore, a change of probability distribution made by a test object 5 is not necessarily independent of the output from another test object 5, but can be correlated with such output. Specifically, for example, when one test object 5a has a probability distribution with a higher winning rate, another test object 5b has a probability distribution which is highly correlated with the probability distribution of the test object 5a, and the other test object 5b has a probability distribution which is negatively correlated with the probability distribution of the test object 5a. Such correlations may be expressed in any form.

In this case, a search for solution is conducted in the same manner as described previously by using the two solution search systems 1a and 1b. Each time an output instruction is issued, the probability distribution of the test object 5 changes chronologically, in response to the output instruction. Moreover, the change in the probability distribution is not independent of the other test objects 5, but has a correlation with more than one of the other test objects 5. By repeating the above processes, the test objects 5 are narrowed down as described earlier, and a test object 5 selected finally is a search solution.

The above case can be discussed by taking an investment such as stocks as an example of the test object 5. Rise and fall in stock prices often correlates with prices of other stocks. An output instruction from the output instructing part 4 can be regarded as stock buying (or short selling). If the same stock is purchased by both the solution search systems 1a and 1b, the price of the stock increases accordingly. This is the same as the change of the probability distribution of the test object 5, which occurs in response to the output instruction mentioned above.

Further, in the present case, the solution search systems 1a and 1b can be linked with each other. For example, the solution search systems 1a and 1b are linked with each other in such a manner that when the solution search system 1a selects a certain test object 5a, the solution search system 1b selects another test object 5c. With this configuration, the search accuracy improves when, for example, the test object 5 is an investment such as stocks, and when a solution search system 1a often makes a decision in association with another solution search system 1b (for example, when Mr. A buys a stock of a company T, Mr. B buys a stock of a company U which has a close business relationship with the company T). The form of correlation between the output instructions from the solution search systems 1a and 1b is not particularly limited.

As another option of the correlation between the solution search systems 1a and 1b, the controlling parts 3 of the solution search systems 1a and 1b interact directly with each other. In this case, for example, the solution search systems 1a and 1b are correlated with each other in such a manner that the aforementioned operational expression used to determine the measurement variable in the solution search system 1a is applied directly in the solution search system 1b.

An example of the above embodiment in which two solution search systems 1a and 1b are used has been described. The embodiment, however, is not limited to the example mentioned above. The embodiment may include any number, but at least two, of the solution search systems.

First Embodiment

In an embodiment shown in FIG. 3, a solution search system 1 to which the present invention is applied is realized by a computer program. In order to realize the system in the form of a computer program, the program has been created so as to include a record superiority comparing step, a controlling step, and an output instructing step, in each of which the same process is implemented as in the record superiority comparing part 2, the controlling part 3, and the output instructing part 4, respectively.

The test object 5 is a device, the winning or losing of which is determined with a predetermined probability. Examples of the test object 5 include a slot machine. The winning rates of the test objects 5-1, 5-2, 5-3, and 5-4 are 0.35, 0.45, 0.55, and 0.65, respectively. The winning rate of the test object 5-0 is $x_0^t$.

Among the above test objects, a combination of two test objects 5 having high winning rates (i.e., the test objects 5-3 and 5-4) is searched for as a desired solution.

In FIG. 3, a feedback count is shown on the abscissa t. The record index $q_i$ is calculated for each of the test objects 5, based on Formula (1). The superiority/inferiority Si is calculated for each of the test objects 5, based on Formula (2). A numerical value $a_i$ indicates any one of the numerical values −1, 0, and 1 (negative one, zero, and one) which is derived from Table 2.

A parameter $v_i$ determines, based on the numerical value $a_i$, whether to accelerate the increase or decrease in a measurement variable. If the numerical value $a_i$ indicates an acceleration used at the time of increasing or decreasing the measurement variable, the parameter $v_i$ indicates a rate of increase and decrease in the measurement variable. The numerical value $a_i$ is represented by a value obtained by differentiating the parameter $v_i$ once. A measurement variable $x_i$ is an actual parameter value obtained by actually increasing or decreasing the measurement variable, based on $v_i$ that is the rate of increase and decrease in the measurement variable. The threshold value is zero.

A result of the above program shows the following: as the feedback count increases, the measurement variable $x_i$ of mostly the test objects 5-3 and 5-4 increases, which causes the output instructing parts 4 to issue an output instruction to the test objects 5-3 and 5-4 repeatedly.

As described thus far, it was validated that the computer program to which the present invention was applied was capable of finding automatically a solution of combinatorial bandit problem.

Figure 4:
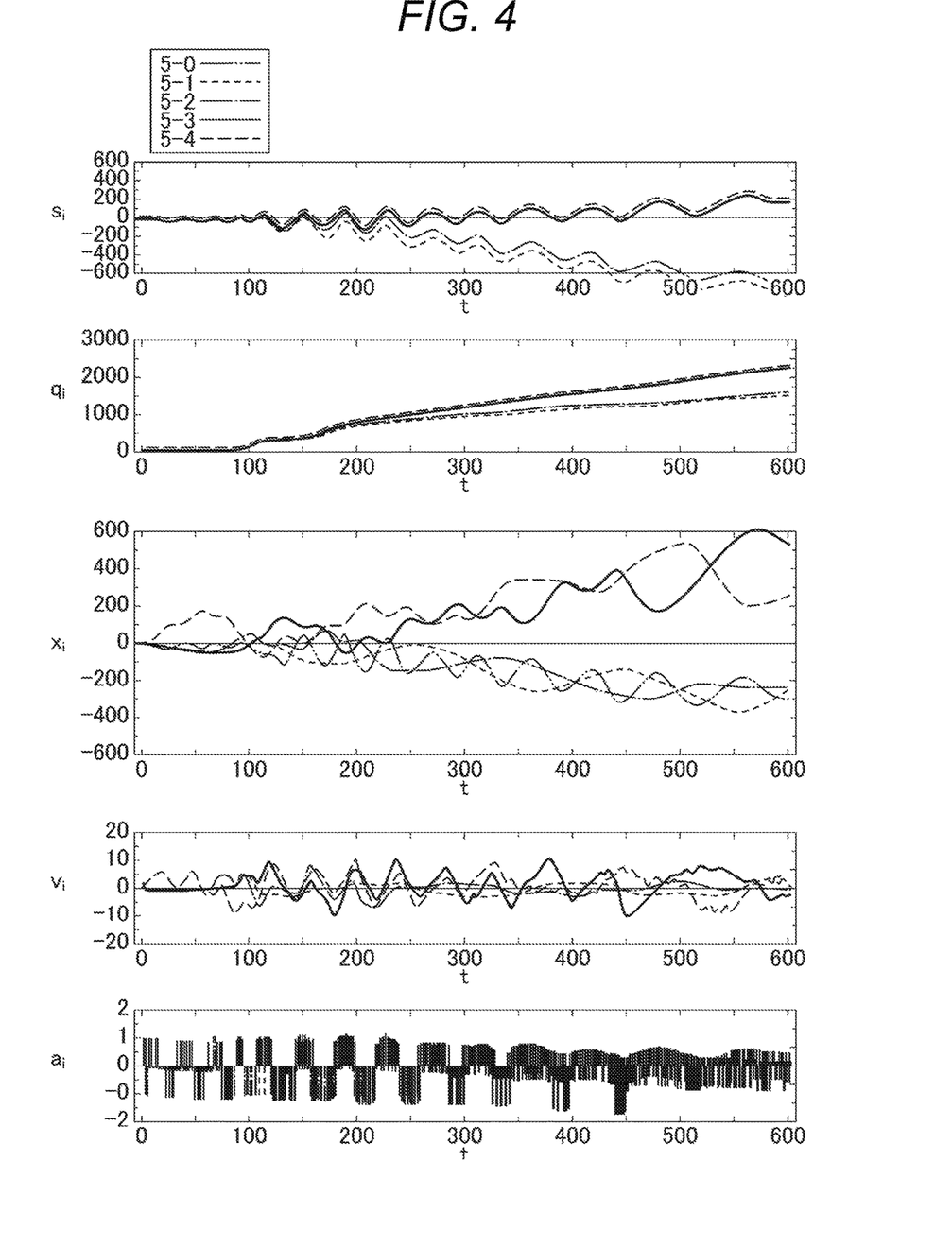
FIG. 4 is a diagram showing an embodiment of a solution search system to which the present invention is applied. The system is a computer program in this case.

FIG. 4 shows a result of a simulation which has been carried out in another embodiment. In the simulation, a computer program to which the present invention is applied selected a combination with a higher winning rate, from among three samples of the test objects 5 with winning rates of 0.2, 0.5, and 0.8. The result from the present embodiment is indicated by a solid line. Comparative example 1 is a softmax algorithm extended to the combinatorial reward maximization problem. Comparative example 2 is an epsilon-greedy algorithm extended to the combinatorial reward maximization problem. As a result of the simulation, it was found that the percentage of correct answers in the computer program to which the present invention was applied was higher than that in the comparison examples, when a feedback count increased.

Figure 5:
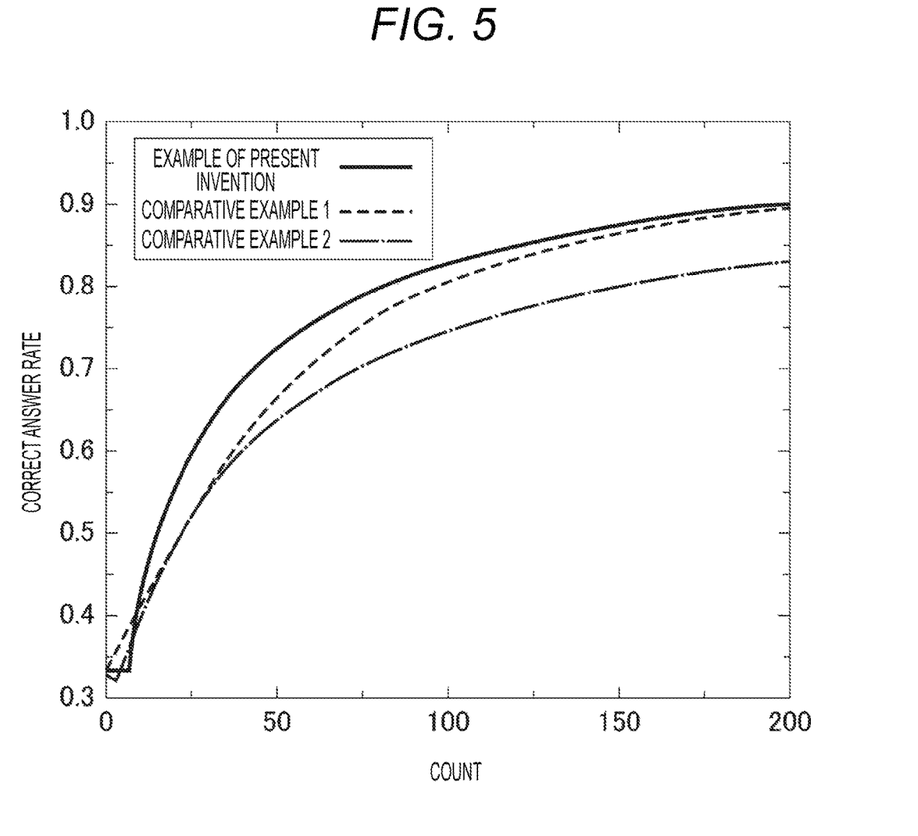
FIG. 5 is a diagram showing an example of a simulation in which a combination is selected from among three samples of test objects with winning rates of 0.2, 0.5, and 0.8.

REFERENCE SIGNS LIST 1 solution search system
2 record superiority comparing part
3 controlling part 4 output instructing part
5 test object
FIG. 1
Control
Output Instruction
Record Superiority Comparison
FIG. 2
Controlling Part
Control
Increase/Decrease
Measurement Parameter
Threshold
Output Instruction
Test Object
FIG. 3
Control
Output Instruction
Record Superiority Comparison
FIG. 5
Example of Present Invention
Comparative Example 1
Comparative Example 2
Correct Answer Rate
Count

The invention claimed is:

1. A solution search system configured to search for a test object expected to output an optimal result, from among at least two test objects each of which outputs a result based on a probability distribution, the solution search system comprising:
a hardware processor or circuitry configured to:
obtain a past record for each of the test objects, based on an accumulation of the results having been output, and compare the records of the test objects in terms of superiority and inferiority in relation to the records of all the test objects;
perform control to increase or decrease a measurement variable for each of the test objects, based on the superiority/inferiority of the record having been compared, and a latest result having been output from the test object;
instruct the test object, the measurement variable of which has exceeded a threshold value, to output a result; and
determine, as a desired solution, at least one test object to which the largest number of the output instructions have finally been given after repetition of the output instructions.

2. The solution search system according to claim 1, the solution search system being further configured to search for a combination of test objects which is expected to output an optimal result, from among at least three test objects each of which outputs a result based on a predetermined probability distribution,
wherein the hardware processor or circuitry is configured to determine, as a desired solution, a combination of test objects to which the largest number of the output instructions have been given after repetition of the output instructions.

3. The solution search system according to claim 1, the solution search system being further configured to search for a combination of test objects, each of the test objects having a probability distribution which varies chronologically in response to an output instruction,
wherein when searching for the solution, at least two solution-search systems are used.

4. The solution search system according to claim 1, wherein hardware processor or circuitry is configured to:
raise the past record of one test object to a superior level, when the test object has output a superior result, while the other test objects have output inferior results; and
lower the past record of one test object to an inferior level, when the test object has output an inferior result, while the other test objects have output superior results.

5. The solution search system according to claim 1, wherein the hardware processor or circuitry, which utilizes an internal resource value which is a difference between the record of one test object and the mean of the records of all the test objects, is configured to:
increase the measurement variable, when the internal resource value is positive, and the latest result having been output from the test object is superior;
maintain the measurement variable, when the internal resource value is positive, and the latest result having been output from the test object is inferior;
increase the measurement variable, when the internal resource value is zero, and the latest result having been output from the test object is superior;
decrease the measurement variable, when the internal resource value is zero, and the latest result having been output from the test object is inferior;
maintain the measurement variable, when the internal resource value is negative, and the latest result having been output from the test object is superior; and
decrease the measurement variable, when the internal resource value is negative, and the latest result having been output from the test object is inferior.

6. The solution search system according to claim 1, wherein the hardware processor or circuitry is configured to perform control so that the sum of the measurement variables which are assigned to the respective test objects can be kept constant.

7. A non-transitory computer-readable medium storing a solution search program thereon, the solution search program being executable by a hardware processor to control the hardware processor to search for a test object expected to output an optimal result, from among at least two test objects each of which outputs a result based on a probability distribution, by controlling the hardware processor to execute processes comprising:
record superiority comparing, in which a past record is obtained for each of the test objects, based on an accumulation of the results having been output, and the records of the test objects are compared in terms of superiority and inferiority in relation to the records of all the test objects;
controlling, in which control is performed to increase or decrease a measurement variable for each of the test objects, based on the superiority/inferiority of the record having been compared by the record superiority comparing, and a latest result having been output from the test object; and
output instructing, in which the test object, the measurement variable of which has exceeded a threshold value, is instructed to output a result,
wherein in the output instructing, the computer is caused to determine, as a desired solution, at least one test object to which the largest number of the output instructions have finally been given after repetition of the output instructions.

8. The non-transitory computer-readable medium according to claim 7, wherein the record superiority comparing comprises:
   raising the past record of one test object to a superior level, when the test object has output a superior result, while the other test objects have output inferior results; and
   lowering the past record of one test object to an inferior level, when the test object has output an inferior result, while the other test objects have output superior results.

9. The non-transitory computer-readable medium according to claim 7, wherein:
   the record superiority comparing utilizes an internal resource value which is a difference between the record of one test object and the mean of the records of all the test objects, and
   the controlling comprises:
      increasing the measurement variable, when the internal resource value is positive, and the latest result having been output from the test object is superior;
      maintaining the measurement variable, when the internal resource value is positive, and the latest result having been output from the test object is inferior;
      increasing the measurement variable, when the internal resource value is zero, and the latest result having been output from the test object is superior;
      decreasing the measurement variable, when the internal resource value is zero, and the latest result having been output from the test object is inferior;
      maintaining the measurement variable, when the internal resource value is negative, and the latest result having been output from the test object is superior; and
      decreasing the measurement variable, when the internal resource value is negative, and the latest result having been output from the test object is inferior.

10. The non-transitory computer-readable medium according to claim 7, wherein in the controlling, control is performed so that the sum of the measurement variables which are assigned to the respective test objects can be kept constant.

11. A solution search method for searching for a test object expected to output an optimal result, from among at least two test objects each of which outputs a result based on a probability distribution, the solution search method being executed by a hardware processor or circuitry, and the solution search method comprising:
   record superiority comparing, in which a past record is obtained for each of the test objects, based on an accumulation of the results having been output, and the records of the test objects are compared in terms of superiority and inferiority in relation to the records of all the test objects;
   controlling, in which control is performed to increase or decrease a measurement variable for each of the test objects, based on the superiority/inferiority of the record having been compared by the record superiority comparing, and a latest result having been output from the test object; and
   output instructing, in which the test object, the measurement variable of which has exceeded a threshold value, is instructed to output a result,
   wherein in the output instructing, at least one test object to which the largest number of the output instructions have finally been given after repetition of the output instructions of the result is determined as a desired solution.

12. The solution search method according to claim 11, wherein the record superiority comparing comprises:
   raising the past record of one test object to a superior level, when the test object has output a superior result, while the other test objects have output inferior results; and
   lowering the past record of one test object to an inferior level, when the test object has output an inferior result, while the other test objects have output superior results.

13. The solution search method according to claim 11, wherein:
   the step of record superiority comparing utilizes an internal resource value which is a difference between the record of one test object and the mean of the records of all the test objects, and
   the controlling comprises:
      increasing the measurement variable, when the internal resource value is positive, and the latest result having been output from the test object is superior;
      maintaining the measurement variable, when the internal resource value is positive, and the latest result having been output from the test object is inferior;
      increasing the measurement variable, when the internal resource value is zero, and the latest result having been output from the test object is superior;
      decreasing the measurement variable, when the internal resource value is zero, and the latest result having been output from the test object is inferior;
      maintaining the measurement variable, when the internal resource value is negative, and the latest result having been output from the test object is superior; and
      decreasing the measurement variable, when the internal resource value is negative, and the latest result having been output from the test object is inferior.

14. The solution search method according to claim 11, wherein in the controlling, control is performed so that the sum of the measurement variables which are assigned to the respective test objects can be kept constant.

* * * * *